United States Patent
Greenfield et al.

(10) Patent No.: US 10,642,283 B2
(45) Date of Patent: May 5, 2020

(54) SIMULTANEOUS FLIGHT PATH CONTROL AND ATTITUDE CONTROL WITH CONTROL AXIS SPLITTING

(71) Applicant: Sikorsky Aircraft Corporation, Stratford, CT (US)

(72) Inventors: Aaron L. Greenfield, Pittsburgh, PA (US); Vineet Sahasrabudhe, Cheshire, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 250 days.

(21) Appl. No.: 15/720,045

(22) Filed: Sep. 29, 2017

(65) Prior Publication Data

US 2018/0101180 A1    Apr. 12, 2018

Related U.S. Application Data

(60) Provisional application No. 62/405,366, filed on Oct. 7, 2016.

(51) Int. Cl.

| G05D 1/08 | (2006.01) |
|---|---|
| B64C 13/04 | (2006.01) |
| B64C 27/56 | (2006.01) |
| B64C 27/68 | (2006.01) |
| B64C 13/50 | (2006.01) |
| B64C 13/12 | (2006.01) |
| B64C 27/06 | (2006.01) |

(52) U.S. Cl.
CPC ....... *G05D 1/0816* (2013.01); *B64C 13/0421* (2018.01); *B64C 13/12* (2013.01); *B64C 13/503* (2013.01); *B64C 27/56* (2013.01); *B64C 27/68* (2013.01); *G05D 1/0858* (2013.01); *B64C 27/06* (2013.01)

(58) Field of Classification Search
CPC ........ B64C 27/06; B64C 27/56; B64C 27/68; B64C 13/0421; B64C 13/12; B64C 13/503; G05D 1/0816; G05D 1/0858
USPC ........................................................ 244/181
See application file for complete search history.

(56) References Cited

U.S. PATENT DOCUMENTS

| 4,801,110 A | 1/1989 | Skutecki | |
|---|---|---|---|
| 5,195,700 A * | 3/1993 | Fogler, Jr. | G05D 1/0061 244/17.13 |
| 5,213,282 A * | 5/1993 | Gold | G05D 1/0061 244/17.13 |
| 5,213,283 A * | 5/1993 | Gold | G05D 1/085 244/17.13 |
| 5,365,446 A * | 11/1994 | Farineau | G05D 1/0638 244/181 |

(Continued)

*Primary Examiner* — Claude J Brown
(74) *Attorney, Agent, or Firm* — Cantor Colburn LLP (57) ABSTRACT

A system and method of controlling flight of an aircraft is disclosed. The system includes a first inceptor that provides a direct mode command for controlling a control axis of the aircraft according to a direct mode and a second inceptor that provides a stable mode command for controlling the control axis of the aircraft according to a stable mode. A processor receives the direct mode command and the stable mode command, forms a combined command for controlling the control axis of the aircraft based on a combination of the direct mode command and the stable mode command, and controls the control axis of the aircraft according to the combined command.

15 Claims, 5 Drawing Sheets

(56) References Cited

U.S. PATENT DOCUMENTS

| | | | | |
|---|---|---|---|---|
| 6,189,836 B1 * | 2/2001 | Gold | ............... | G05D 1/0816 244/17.13 |
| 6,592,071 B2 * | 7/2003 | Kinkead | ............... | G05D 1/102 244/194 |
| 6,885,917 B2 * | 4/2005 | Osder | ............... | B64C 27/18 244/10 |
| 8,185,255 B2 * | 5/2012 | Lavretsky | ............... | G05D 1/0825 244/75.1 |
| 8,185,259 B2 * | 5/2012 | Omar | ............... | G05D 1/063 244/164 |
| 8,556,207 B2 | 10/2013 | Cilli | | |
| 8,688,295 B2 | 4/2014 | Ellis et al. | | |
| 8,855,837 B2 * | 10/2014 | Cherepinksy | ............... | B64C 19/00 701/4 |
| 9,340,278 B2 * | 5/2016 | Hagerott | ............... | B64C 9/04 |
| 2011/0057071 A1 * | 3/2011 | Sahasrabudhe | ............... | G05D 1/0858 244/17.13 |
| 2011/0168851 A1 * | 7/2011 | Cherepinsky | ............... | G05D 1/0858 244/223 |
| 2015/0314866 A1 * | 11/2015 | Agnihotri | ............... | B64C 27/57 244/17.13 |
| 2016/0031554 A1 | 2/2016 | Eshkenazy et al. | | |
| 2017/0329349 A1 * | 11/2017 | Greenfield | ............... | G05D 1/0825 |
| 2017/0350491 A1 * | 12/2017 | Wilkens | ............... | B64C 13/04 |

\* cited by examiner

SIMULTANEOUS FLIGHT PATH CONTROL AND ATTITUDE CONTROL WITH CONTROL AXIS SPLITTING

CROSS REFERENCE TO RELATED APPLICATIONS

The present application claims priority from U.S. Provisional Application Ser. No. 62/405,366, filed on Oct. 7, 2016, the contents of which are incorporated herein by reference in their entirety.

BACKGROUND OF THE INVENTION

The present invention is directed to a system and method for flying an aircraft and, in particular, to a system that allows a pilot simultaneous access to stable and direct modes of flying the aircraft using two different inceptors, as well as providing a method for blending and fading in between the direct and stable mode for flying the aircraft.

Various rotary-wing aircraft can be flown in different modes of operation. For example, a fly-by-wire aircraft can employ a computer-assisted flight system in which a pilot indicates a flight parameter such as velocity, orientation, altitude, etc. for the aircraft and a computer determines what actions are to be taken at the flight surfaces of the aircraft to implement the pilot's indicated flight parameter. This mode of operation is generally implemented to provide a highly stable but less agile aircraft. In certain conditions, however, such as inclement weather, etc., the pilot needs to operate the aircraft in another mode in which the pilot has more direct control of the aircraft in order to react with more agility to the flight conditions. Previous approaches to providing two modes of operation provide a single inceptor with a button for the pilot to push to select the mode. However when the pilot pushes the button, there can be confusion as to which mode of operation the aircraft is currently in. Also, switching between modes of operation can be unpredictable and requires mental and physical agility on the part of the pilot.

SUMMARY OF THE INVENTION

According to one embodiment of the present invention, a method of controlling flight of an aircraft includes: receiving, from a first inceptor, a direct mode command for controlling a control axis of the aircraft according to a direct mode; receiving, from a second inceptor, a stable mode command for controlling the control axis of the aircraft according to a stable mode; and blending the direct mode command with the stable mode command to fly the aircraft with respect to the control axis according to a combined mode that is a combination of the direct mode and the stable mode.

According to one embodiment of the present invention, a system for controlling a flight of an aircraft includes: a first inceptor that provides a direct mode command for controlling a control axis of the aircraft according to a direct mode; a second inceptor that provides a stable mode command for controlling the control axis of the aircraft according to a stable mode; a processor configured to: receive the direct mode command, receive the stable mode command, form a combined mode for controlling the control axis of the aircraft based on a combination of the direct mode command and the stable mode command, and control the control axis of the aircraft according to the combined command.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
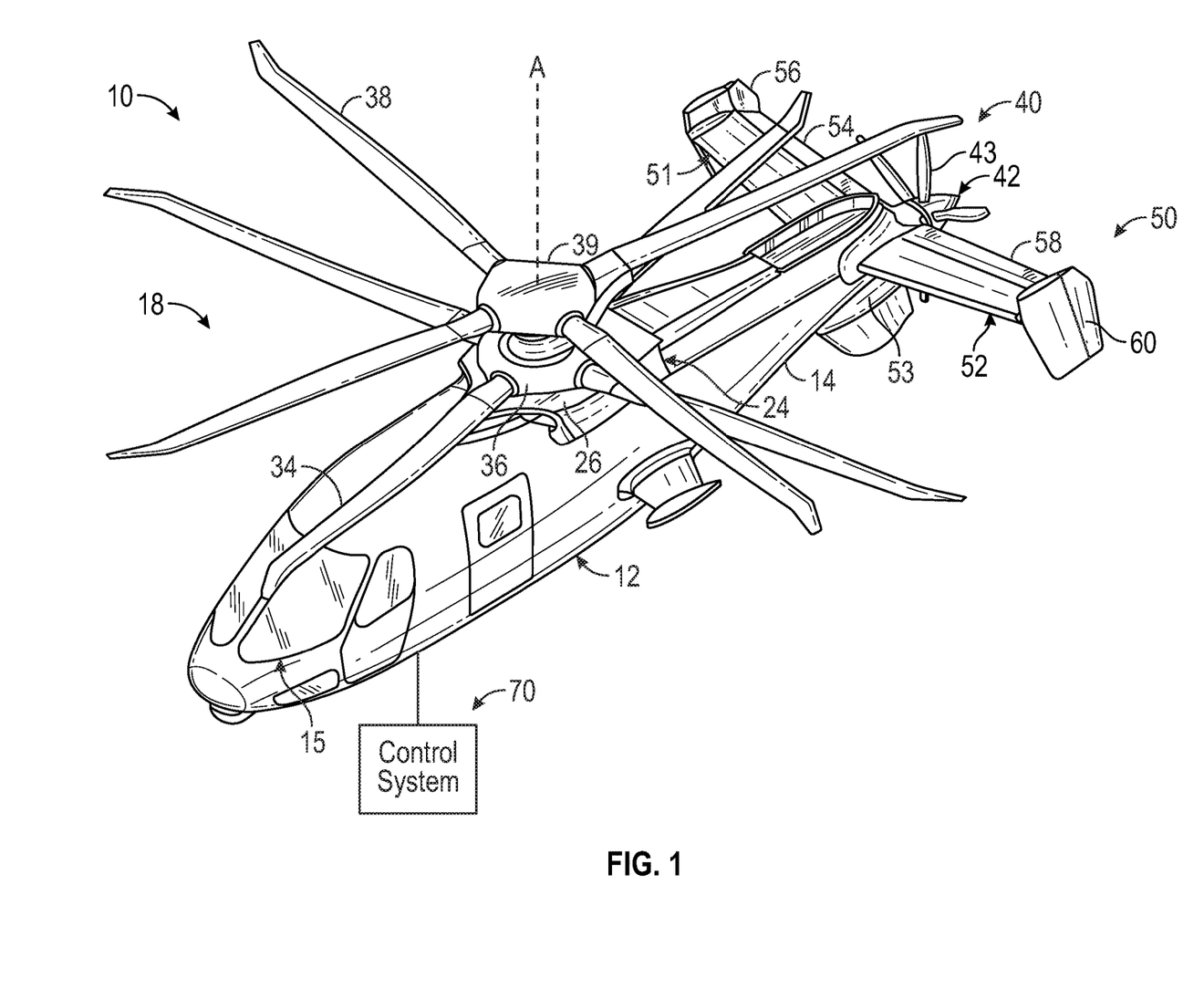
FIG. 1 depicts an exemplary embodiment of a coaxial rotary wing, vertical takeoff and land (VTOL) aircraft.

Referring now to the Figures, where the invention will be described with reference to specific embodiments, without limiting same, FIG. 1 depicts an exemplary embodiment of a coaxial rotary wing, vertical takeoff and land (VTOL) aircraft 10. The aircraft 10 includes an airframe 12 with an extending tail 14. A dual, counter rotating, coaxial main rotor assembly 18 is located at the airframe 12 and rotates about a main rotor axis, A. In an exemplary embodiment, the airframe 12 includes a cockpit 15 having two seats for flight crew (e.g., pilot and co-pilot) and six seats for passengers (not shown). Main rotor assembly 18 is driven by a power source, for example, one or more engines 24 via a gearbox 26. Main rotor assembly 18 includes an upper rotor assembly 28 driven in a first direction (e.g., counter-clockwise) about the main rotor axis, A, and a lower rotor assembly driven in a second direction (e.g., clockwise) about the main rotor axis, A, opposite to the first direction (i.e., counter rotating rotors). Upper rotor assembly includes a first plurality of rotor blades 38 supported by a first rotor hub 39. Lower rotor assembly includes a second plurality of rotor blades 34 supported by a second rotor hub 36. The first plurality of rotor blades 38 rotate through a first rotor disk and the second plurality of rotor blades 34 rotate through a second rotor disk. In some embodiments, the aircraft 10 further includes a translational thrust system 40 having a propeller 42 located at the extending tail 14 to provide translational thrust (forward or rearward) for aircraft 10. Propeller 42 includes a plurality of propeller blades 43.

Propeller 42, or translational thrust system 40, is connected to, and driven by, the engine 24 via the gearbox 26. Translational thrust system 40 may be mounted to the rear of the airframe 12 to provide thrust for high-speed flight. While shown in the context of a pusher-prop configuration, it is understood that the propeller 42 could also be a more conventional puller prop or could be variably facing so as to provide yaw control in addition to, or instead of, translational thrust. It should be understood that any such system or other translational thrust systems may alternatively or additionally be utilized. Alternative translational thrust systems may include different propulsion forms, such as a jet engine.

In accordance with an aspect of an exemplary embodiment, propeller blades 43 of translational thrust system 40 may include a variable pitch. More specifically, the pitch of propeller blades 43 may be altered to change the direction of thrust (e.g., forward or rearward). In accordance with another aspect of an exemplary embodiment, extended tail 14 includes a tail section 50 including starboard and port horizontal stabilizers 51 and 52. Tail section 50 also includes a vertical stabilizer 53 that extends downward from extending tail 14. Starboard horizontal stabilizer 51 includes a starboard active elevator 54 and a starboard active rudder 56. Similarly, port horizontal stabilizer 52 includes a port active elevator 58 and a port active rudder 60. Elevators 54 and 58 and rudders 56 and 60 act as controllable flight surfaces, e.g., surfaces that alter a flight path/characteristics of aircraft 10.

Aircraft 10 includes a control system 70 for controlling flight of the aircraft 10. The control system 70 includes a processor (not shown) that executes a flight control system such as discussed below with respect to FIGS. 3-5, in one embodiment. Aircraft 10 includes control axes that define rotation of the aircraft with respect to the body of the aircraft. Control of the aircraft around a control axis provides a motion of the aircraft that changes a flight state of the aircraft. For example, control of the aircraft around longitudinal control axis provides a roll of the aircraft. Similar axes define pitch and yaw angles and angular rates. A control axis may also refer to velocity, altitude, etc.

Figure 2:
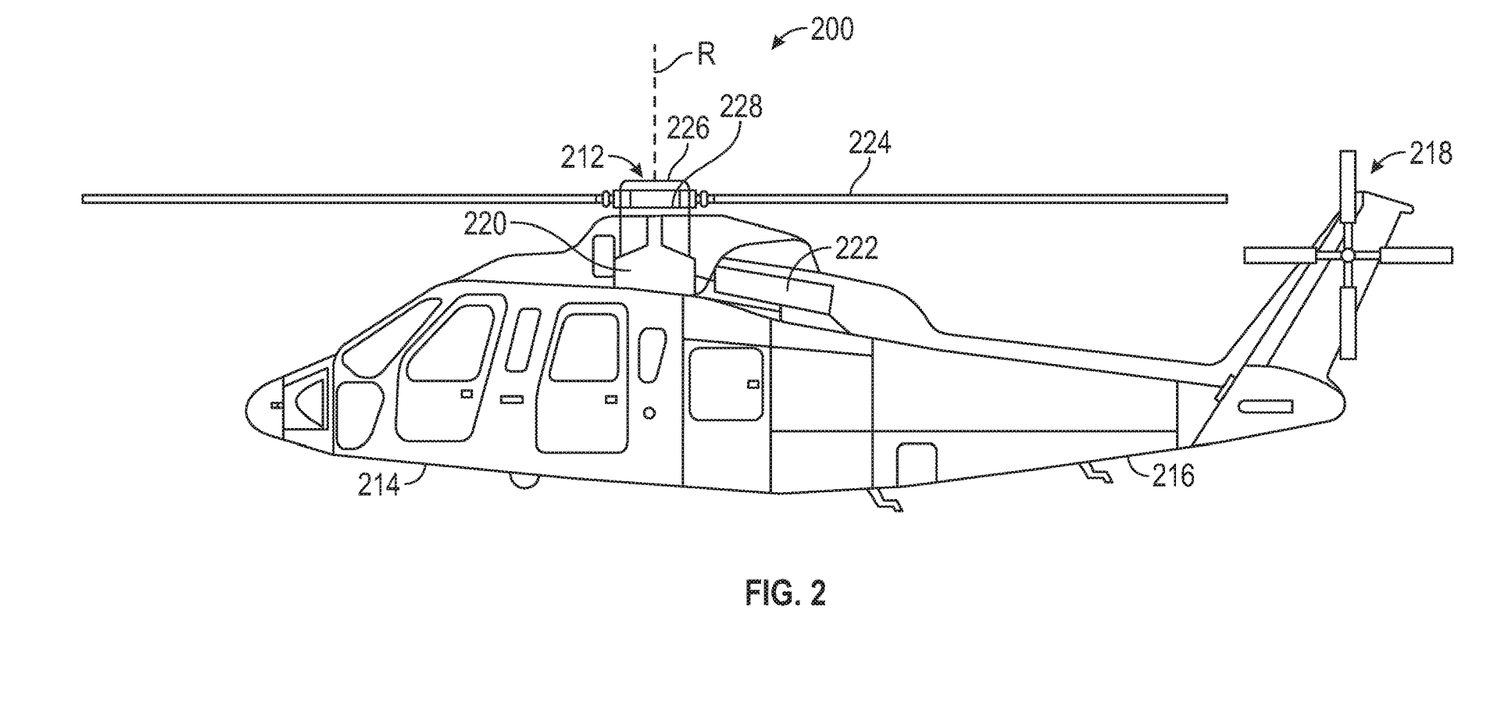
FIG. 2 schematically illustrates a conventional rotary wing aircraft having a main rotor assembly.

FIG. 2 schematically illustrates a conventional rotary wing aircraft 200 having a main rotor assembly 212. The aircraft 200 includes an airframe 214 having an extending tail 216 which mounts a tail rotor assembly 218, such as an anti-torque system. The main rotor assembly 212 is driven about an axis of rotation R through a gearbox (illustrated schematically at 220) by one or more engines 222. The main rotor assembly 212 includes multiple rotor blades 224 mounted to a rotor hub 226, and a swashplate 228 that is used to affect a state or orientation of the rotor blades 224. The rotor blades 224 can have a variable pitch that can be used to affect pitch and roll angles of the aircraft 200 as well as velocity of the aircraft 200. The pitch of the rotor blades 224 can be controlled by a collective control or by a cyclic control. The aircraft 200 may include a control system (similar to control system 70 of FIG. 1) for flying the aircraft 200 according to the methods disclosed herein. As with aircraft 10 in FIG. 1, aircraft 200 has control axes for controlling a flight state of the aircraft 200. Although particular helicopter configurations are illustrated herein in FIGS. 1 and 2 and described in the disclosed embodiment, other configurations and/or machines, such as high speed compound rotary wing aircraft with supplemental translational thrust systems, dual contra-rotating aircraft, turboprops, tilt-rotors and tilt-wing aircraft, will also benefit from embodiments of the invention.

Figure 3:
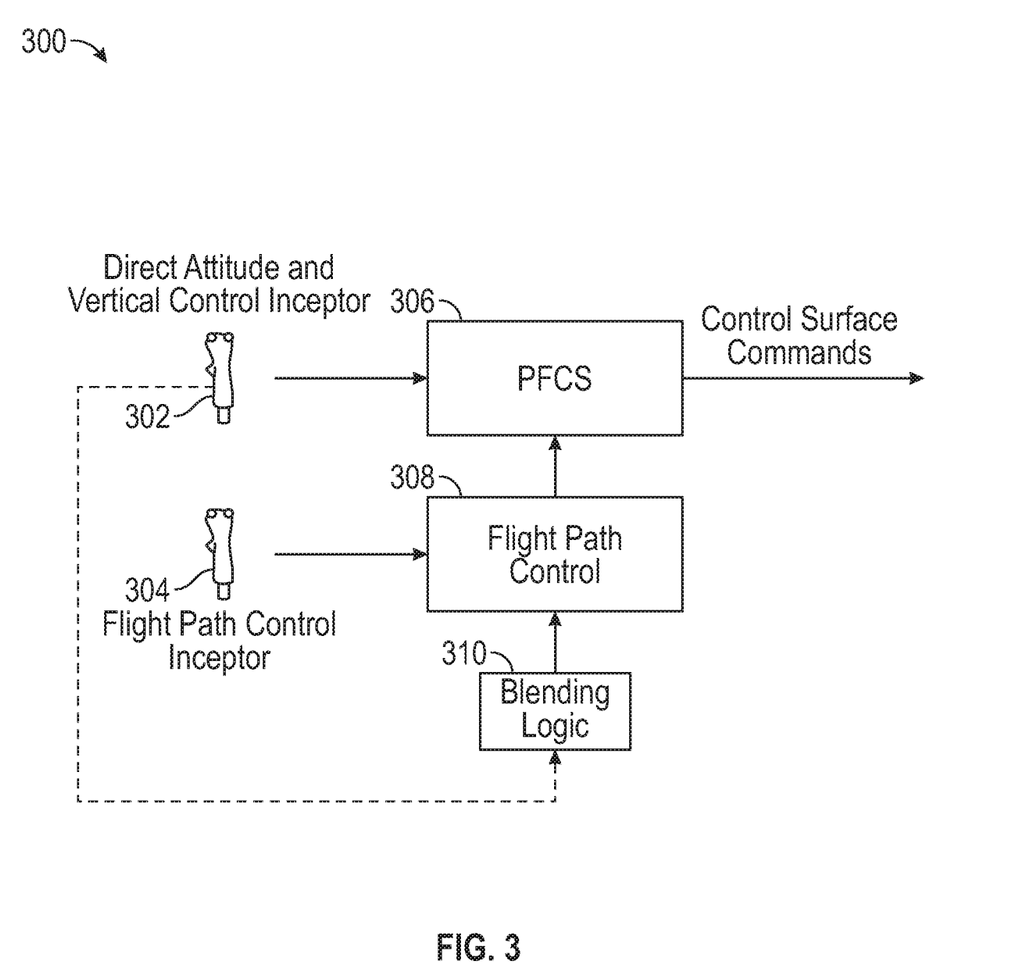
FIG. 3 illustrates a high-level schematic diagram of a controller splitting system for flying the aircrafts of FIGS. 1 and 2.

FIG. 3 illustrates a high-level schematic diagram 300 of a controller splitting system (such as controller 70 in FIG. 1) for flying either the coaxial rotary wing aircraft 10 of FIG. 1 or the conventional rotary wing aircraft 200 of FIG. 2. The diagram 300 includes a first inceptor 302 and a second inceptor 304. Each of the first inceptor 302 and the second inceptor 304 has the ability to control one or more control axes of the aircraft. In one embodiment, the first inceptor 302 can be a right-hand inceptor that is to be manipulated by a right hand of a pilot and the second inceptor 304 can be a left-hand inceptor that is to be manipulated by a left hand of a pilot. However, the selection of which inceptor is manipulated by which hand is not intended as a limitation of the invention. Other inceptor configurations not described herein can also be possible within the scope of this invention.

The first inceptor 302 is a direct attitude and vertical control inceptor (also referred to herein as a "direct inceptor") and is used to control various flight surfaces of the aircraft 10 in a first mode (also referred to herein as a "direct mode"). The first inceptor 302 provides a direct mode command to a primary flight control system (PFCS) 306. The PFCS 306 converts the direct mode command to desired rates and attitudes, which are used to control the flight control surfaces. The direct mode command is implemented at the flight control surfaces directly or with a minimum of computer assistance. The direct mode therefore allows the aircraft to respond quickly to the pilot's commands, allowing the pilot to perform agile maneuvers at the aircraft.

The second inceptor 304 is a flight path control inceptor. The pilot controls the second inceptor 304 to fly the aircraft in a stable mode (also referred to herein as a "flight path mode"). The second inceptor 304 provides a flight path mode command (or "stable mode command") that indicates a desired flight path (i.e., a desired speed or direction) of the aircraft. The stable mode command is received at a flight path controller 308, which determines an angle of a flight surface, a propeller pitch, etc., for flying the aircraft 10 according to the stable mode command. The flight path controller 308 cooperates with the PFCS 306 in order to provide control surface commands to control the flight control surfaces of the aircraft. The stable mode allows the aircraft 10 to fly with a high degree of stability. However, the stable mode is slower in implementing the stable mode commands at the aircraft than the direct mode is at implementing the direct mode commands at the aircraft. Both the first inceptor and the second inceptor can provide a command for controlling a control axis of the aircraft.

In accordance with one embodiment, the stable mode is combined with the direct mode to fly the aircraft according to a combined mode. The combined mode combines the agility of the direct mode with the stability provided by the stable mode. A blending logic module 310 determines a blending ratio for the direct mode and stable mode in the combined mode or, alternatively, an amount of feedback provided by the stable mode in the blended mode. The blending ratio determines a relative mixture of the direct mode command and the stable mode command in a combined command. The blending logic module 310 receives the direct mode command from the first inceptor 302 and controls the response of the flight path controller 308 according to the direct mode command. The greater the use of the first inceptor 302, the more influence the blending logic module 310 exerts on the flight path controller 308 to reduce or diminish an amount of feedback from the stable mode that is in the combined mode, i.e., to reduce or diminish the presence of the stable mode in the combined mode.

Figure 4:
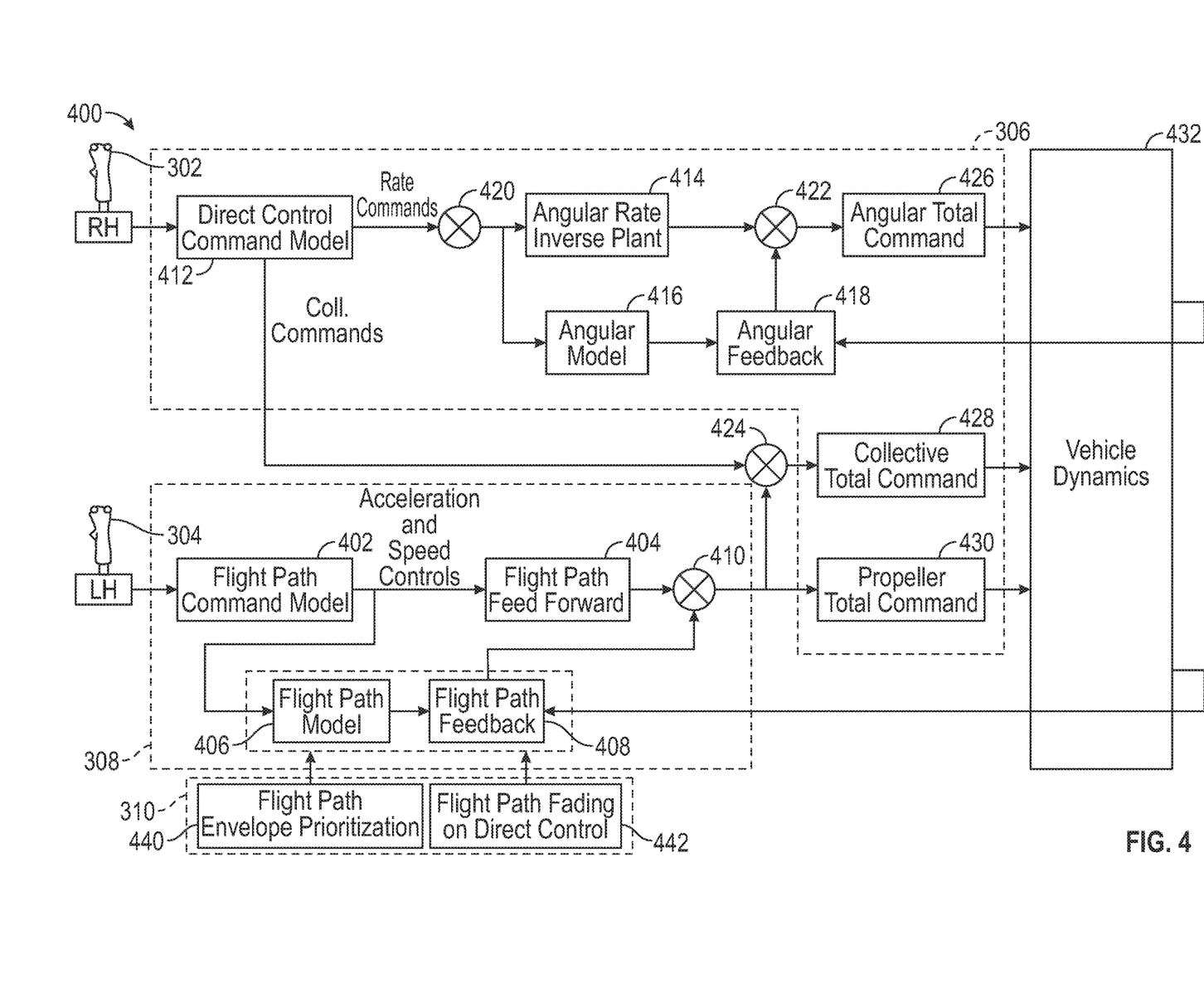
FIG. 4 shows a detailed schematic diagram of the controller splitting system of FIG. 3.

FIG. 4 shows a detailed schematic diagram 400 of the controller splitting system of FIG. 3 including, in particular, the details of the PFCS 306, the flight path controller 308 and the blending logic module 310.

The flight path controller 308 includes a flight path command model 402, a flight path feedforward model 404, a flight path model 406 and a flight path feedback model 408. The flight path command model 402 receives the stable mode command from the second inceptor 304 and outputs a dynamic parameter of the aircraft 10 indicated by the stable mode command, such as an acceleration and/or velocity. The flight path feedforward model 404 receives the acceleration and velocity from the flight path command model 402 and provides a corresponding rate command for the PFCS 306 as well as collective angle commands and propeller control surface commands. The flight path feedforward model 404 may select from a number of methods for controlling flight surfaces to attain an indicated acceleration or velocity, based on the type of aircraft. For example, for the coaxial rotary wing aircraft 10 rate command may change a pitch of the propeller blades 43 in order to change a forward velocity of the aircraft 10. Alternatively for conventional rotary wing aircraft 200, the rate command may change a pitch attitude of the aircraft to control forward velocity.

Flight path model 406 receives the acceleration command from flight path command model 402 and determines a velocity, climb rate and other flight parameters that will be result at the aircraft 10 once the acceleration command is implemented. The flight path feedback model 408 receives the determined velocity, climb rate, etc., from the flight path model 406 as well as current flight states 432 of the aircraft, which provide a current velocity among others. The current flight states 432 can be provided to the flight path feedback model 408 by sensors on the aircraft. The flight path feedback model 408 determines a velocity difference between the determined velocity and the current velocity, among other flight path states, and provides a flight path feedback command based on the velocity difference. The flight path feedback command from the flight path feedback model 408 is combined with the flight path feedback command from the flight path feedforward model 404 at 410. The combined flight path feedback command is then provided from the flight path controller 308 to the PFCS 306 to be implemented in a manner consistent with the type of aircraft. For example, in an embodiment including a coaxial rotary aircraft 10 as shown in FIG. 1, the flight path feedback command is a combination of a propeller pitch command provided to a propeller total command module 430, a collective command provided to PFCS at 424, and an angular rate command provided to PFCS at 420. In an embodiment including a conventional rotary wing aircraft 200 as shown in FIG. 2, the flight path feedback command is a combination of a collective pitch command that is provided to a collective total command module 428 and an angular rate command provided to a PFCS 420. Thus, the flight path command for coaxial rotary aircraft provided from the flight path controller 308 can be split into an angular rate component and a propeller component.

The PFCS 306 includes a direct attitude and vertical control command model 412, an angular rate inverse plant 414, an angular model 416 and an angular feedback model 418. The PFCS 306 further includes an angular total command module 426, a collective total command module 428 and a propeller total command module 430 which implement control commands at the various flight surfaces of the aircraft 10.

The direct attitude and vertical control command model 412 receives the direct mode command from the first inceptor 302 and outputs an angular rate command and a collective command indicative of the direct mode command. In one embodiment, the angular rate command is combined at 420 with the angular component of the flight path feedback command from the flight path controller 308. This combined angular rate command is provided to both the angular rate inverse plant 414 and the angular model 416.

The angular rate inverse plant 414 determines a position of a flight surface for implementing the combined angular rate command and provides a flight surface command. Angular model 416 receives the combined angular rate command and determines an angle or orientation of the aircraft once the combined rate command is implemented. An angular feedback model 418 receives the determined angle or orientation from the angular model 416 as well as a current flight angle or orientation of the aircraft from current flight dynamics 432. The angular feedback model 418 then determines a difference between the current flight angle or orientation and the determined flight angle or orientation and provides a flight surface command based on the difference. At 422, the flight surface command from the angular feedback module 418 is combined with the flight surface command from the angular rate inverse plant 414 to provide a combined flight surface command. The combined flight surface command from 422 is input into the angular total command module 426 to be implemented at the aircraft.

The collective command provided by the direct attitude and vertical control command model 412 is combined at 424 with a collective command from the flight path controller 308 to form a combined collective command for input into the collective total command module 428. The collective total command module 428 implements the combined collective command at the aircraft 10.

Blending logic module 310 includes a flight path envelope prioritization model 440 and a flight path fading on direct control model 442, which can be used separately or together to control the feedback effect that the stable mode of operation has on the combined mode of operation. The flight path envelope prioritization model 440 prioritizes flight path variables that are computed at the flight path model 406. The flight path fading on direct control model 442 increases or decreases the influence of the results from the flight path feedback model 408 on the angular rate command and collective and propeller commands provided by the flight path controller 308.

Figure 5:
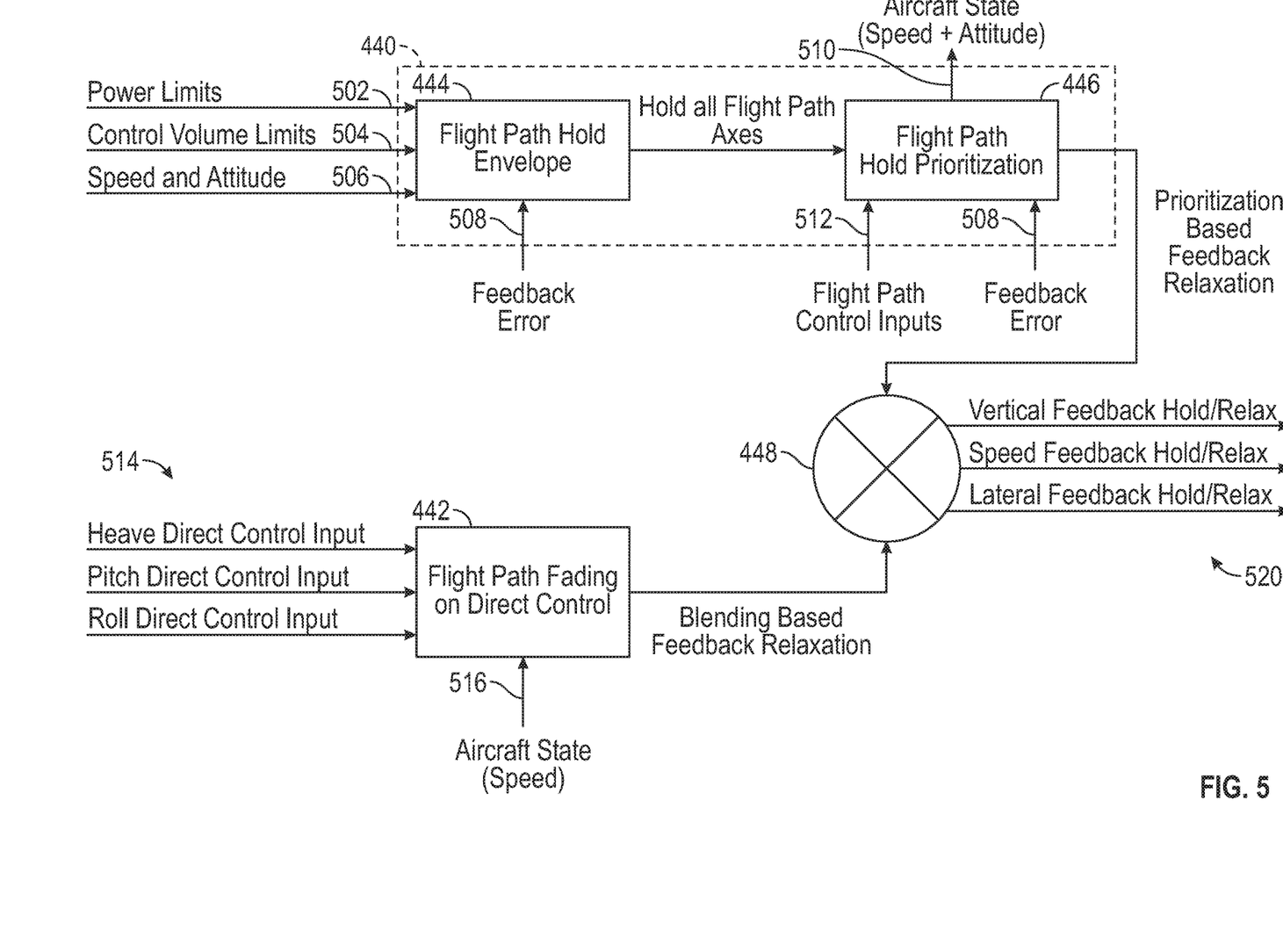
FIG. 5 shows a detailed schematic view of a blending logic module of the controller splitting system.

FIG. 5 shows a detailed schematic view of the blending logic module 310 of FIGS. 3 and 4. The flight path envelope prioritization model 440 includes a flight path hold envelope module 444 that determines a flight envelope of the aircraft and a flight path hold prioritization module 446 that prioritizes flight parameters with respect to a pilot's input.

The flight path hold envelope module 444 provides a definition of where all flight path variables can be held. The definition of where flight path variables can be held is given in terms of power limits 502 including torque limitations, control volume limits 504, aircraft state including attitude and speed and load factor 506 and feedback error 508. The flight path hold envelope module 444 determines whether the aircraft can hold to all flight path variables. The need for a tradeoff in flight path variables occurs because flight path variables are often interrelated during certain flight maneuvers. For example, pitching a conventional rotary wing aircraft up to decrease speed of the aircraft also causes the aircraft to experience lift.

The flight path hold prioritization module 446 is a relaxation algorithm which determines which flight path variables to relax, and by how much, whenever the flight path variables cannot be held simultaneously. The flight path hold prioritization module 446 relaxes the feedback error 508 of the flight path controller 308 to allow a maneuver to occur in which the aircraft is outside of a flight path hold envelope. For example, the flight path hold prioritization module 446 may allow a maneuver to occur in which the aircraft goes outside of its climb rate hold envelope in order to perform a slowdown in speed.

In operation, the flight path hold prioritization module 446 receives the command set from the flight path hold envelope module 444 as well as data on aircraft state 510, including speed, attitude, etc., flight path controller inputs (i.e., pilot inputs) 512 and feedback error 508. The flight path hold prioritization module 446 detects a pilot's direct mode commands and relaxes controls on other flight parameters in order to accommodate the pilot's direct mode commands. For example, in a conventional helicopter, reaching a power limit at high speed is associated with vertical flight path (holding altitude). In a scenario in which the pilot of a conventional helicopter is commanding a particular flight path dimension, for example, a moderate agility deceleration from high speed which results in an inability to simultaneously hold altitude, the prioritization module 446 can give priority to the axis being controlled (i.e., deceleration) rather than to axes that are not being controlled (i.e., altitude).

The flight path fading on direct control model 442 provides a blending algorithm between the direct mode commands provided by the direct inceptor 302 and the stable mode commands provided by the flight path inceptor 304. The flight path fading on direct control model 442 receives pilot input 514 and aircraft state parameters 516 such as flight speed, etc. When the pilot applies input 514 to the direct inceptor 302, the flight path fading on direct control model 442 reduces the authority of the stable mode in the combined mode, thereby allowing the pilot more direct control of the aircraft. Once the pilot stops providing input 514 at the direct inceptor 302, flight path fading on direct control model 442 restores full authority of the stable mode so that the full benefit of the stable mode can be achieved.

The flight path envelope prioritization model 440 provides a prioritization based feedback signal to blending block 448. The flight path fading on direction control model 442 provides a blending based feedback signal to the blending block 448. Blending block 448 blends prioritization based feedback signal and the blending based feedback signal to create a blending command 520 that is provided to the aircraft or, more specifically, to the flight path model 406. The blending command 520 includes vertical feedback hold/relax command, speed feedback hold/relax command and a lateral feedback hold/relax command.

Tables 1 and 2 provide possible control modes for both direct mode and stable mode for a coaxial rotary wing helicopter and a conventional rotary wing helicopter. Control modes are separated into three categories: (1) low speed, (2) high speed and (3) ground handling. Control modes are listed only for the pitch and heave axes for illustrative purposes. However, additional table entries can be provided for roll and yaw axes as well. Tables 1 and 2 have a command effect column and a feedback effect column. Command effect describes the commanded aircraft response for the first inceptor and second inceptor. Feedback effect describes the effect of these inceptors on the flight path feedback.

TABLE 1

| Axis | Command Effect | Feedback Effect |
|---|---|---|
| Low Speed | | |
| Pitch (Flt Path) | Blended Translational Rate/Linear Acceleration (Prop/Attitude Blend modified by Direct Att Pitch Input) | Fwd Vel (forward velocity): Updated with Command<br>Vert Vel (vertical velocity): No Effect |
| Heave (Flt Path) | Blended Climb Rate/Climb Acceleration | Fwd Vel: No Effect<br>Vert Vel: Updated with Command |
| Pitch (Direct) | Blended Attitude Command/Rate Command | Fwd Vel: Retained for small inputs (controls additional DOF)<br>Vert Vel: Held in envelop |
| Heave (Direct) | Collective | Fwd Vel: No Effect<br>Vert Vel: Sync |
| High Speed | | |
| Pitch (Flt Path) | Linear Acceleration (Prop/Attitude Blend modified by Direct Attitude Pitch Input) | Fwd Vel - Updated with Command<br>Vert Vel - Maintained in envelop |
| Heave (Flt Path) | Climb Rate (with Attitude) | Fwd Vel - Held in envelop<br>Vert Vel - Updated with Command |
| Pitch (Direct) | Angular Rate | Fwd Vel - Held in an envelop<br>Vert Vel - Synch |
| Heave (Direct) | Collective | Fwd Vel - No Effect<br>Vert Vel - Synch |
| Ground Mode | | |
| Pitch (Flt Path) | Propeller | Fwd Vel, Vert Vel - Off |
| Heave (Flt Path) | Collective | Fwd Vel, Vert Vel - Off |
| Pitch (Direct) | Cyclic | Fwd Vel, Vert Vel - Off |
| Heave (Direct) | Collective | Fwd Vel, Vert Vel - Off |

TABLE 2

| Axis | Command Effect | Feedback Effect |
|---|---|---|
| Low Speed | | |
| Pitch (Flt Path) | Blended Translational Rate/Linear Acceleration | Fwd. Vel - Updated with command<br>Vert. Vel - No Effect |
| Heave (Flt Path) | Blended Climb Rate/Climb Acceleration | Fwd Vel - No Effect<br>Vert. Vel - Updated with command |

TABLE 2-continued

| Axis | Command Effect | Feedback Effect |
|---|---|---|
| Pitch (Direct) | Blended Attitude Command/ Rate Command | Attitude Feedback Updated Fwd Vel - Reduced Auth/Synch Vert Vel - Reduced at extreme att. |
| Heave (Direct) | Collective | Fwd. Vel - No Effect Vert Vel - Synch |
| High Speed | | |
| Pitch (Flt Path) | Linear Acceleration | Fwd Vel - Updated with Command Vert Vel - Retained for limited envelop, synch for larger inputs |
| Heave (Flt Path) | Climb Rate | Fwd Vel - No Effect Vert Vel - Updated with Command |
| Pitch (Direct) | Angular Rate | Fwd Vel - Off, Synching Vert Vel - Off |
| Heave (Direct) | Collective | Fwd Vel - No Effect Vert Vel - Synch |
| Ground Mode | | |
| Pitch (Flt Path) | Cyclic | Fwd Vel, Vert Vel - Off |
| Heave (Flt Path) | Collective | Fwd Vel, Vert Vel - Off |
| Pitch (Direct) | Cyclic | Fwd Vel, Vert Vel - Off |
| Pitch (Direct) | Collective | Fwd Vel, Vert Vel - Off |

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A method of controlling flight of an aircraft, comprising:
    receiving, from a first inceptor, a direct mode command that provides a direct control of a control axis of the aircraft by a pilot;
    receiving, from a second inceptor, a stable mode command indicative of a desired flight path, wherein control of the control axis of the aircraft according to a stable mode is based on the desired flight path; and
    blending the direct mode command with the stable mode command to obtain a combined command for controlling the control axis of the aircraft, wherein the presence of the stable mode command in the combined mode is reduced by an amount of input at the first inceptor.

2. The method of claim 1, wherein the direct mode command is received at a primary flight control system, the stable mode command is received at a flight path controller, and output from the flight path controller is provided to the primary flight control system.

3. The method of claim 2, wherein the aircraft includes multiple surfaces for controlling the control axis and the output from the flight path controller includes at least one of an angular component and a propeller component.

4. The method of claim 2, further comprising a blending logic module that controls a blending ratio of the direct mode command and the stable mode command.

5. The method of claim 4, wherein the blending logic module provides a blending command to the flight path controller that is a combination of a prioritization based feedback signal and a blending based feedback signal.

6. The method of claim 5, wherein the blending logic module determines when the aircraft is flying outside of a flight path hold envelope of the aircraft and prioritizes flight parameters for the aircraft with respect to the flight path hold envelope based on a pilot's input.

7. The method of claim 6, wherein the blending logic module controls an authority of the stable mode for flying the aircraft in response to the direct mode command.

8. The method of claim 1, wherein the direct mode command directly controls a flight surface of the aircraft and the stable mode command provides a flight path command to the aircraft.

9. A system for controlling a flight of an aircraft, comprising:
    a first inceptor that provides a direct mode command;
    a second inceptor that provides a stable mode command;
    a processor configured to:
        receive the direct mode command,
        determine a first flight command for controlling an axis of the aircraft based on the direct mode command;
        receive the stable mode command,
        determine a flight path indicated by the stable mode command;
        determine a second flight command for controlling the axis of the aircraft based on the flight path;
        form a combined command for controlling the control axis of the aircraft based on a combination of the first flight command and the second flight command, wherein a presence of the second flight command in the combined command is reduced by an amount of input at the first inceptor, and
        control the control axis of the aircraft according to the combined command.

10. The system of claim 9, further comprising a primary flight control system for receiving the direct mode command and a flight path controller for receiving the stable mode command, wherein an output from the flight path controller is provided to the primary flight control system.

11. The system of claim 10, wherein the aircraft includes multiple surfaces related to the control axis and the output from the flight path controller includes at least one of an angular component and a propeller component.

12. The system of claim 10, further comprising a blending logic module that controls a blending ratio of the direct mode command and the stable mode command in the combined command.

13. The system of claim 12, wherein the blending logic module provides a blending command to the flight path control that is a combination of a prioritization based feedback signal and a blending based feedback signal.

14. The system of claim 13, wherein the blending logic module includes a flight path hold envelope module that determines when the aircraft is flying outside of a flight envelope of the aircraft and a flight path hold prioritization module that prioritizes flight parameters for the aircraft with respect to the flight envelope based on a pilot's input and provides the prioritization based feedback signal.

15. The system of claim 14, wherein the blending logic module provides the blending based feedback signal based on the direct command from the first inceptor to control an authority of the stable mode for flying the aircraft.

* * * * *